Figure 3:
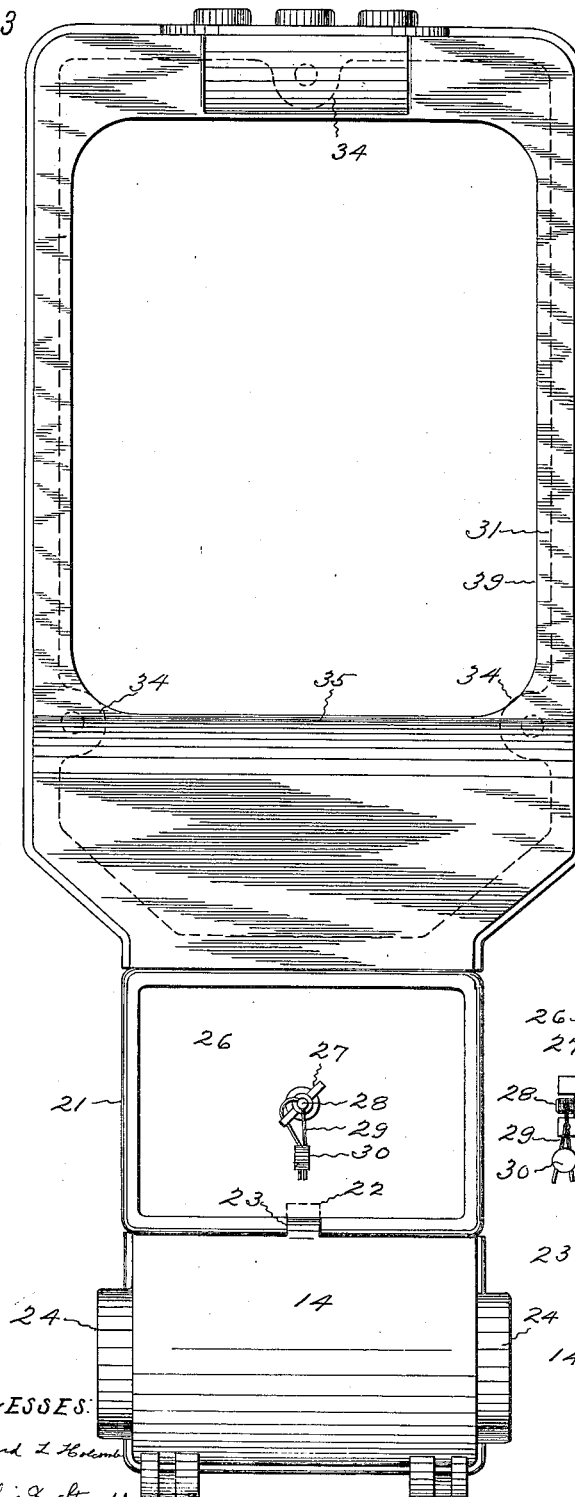

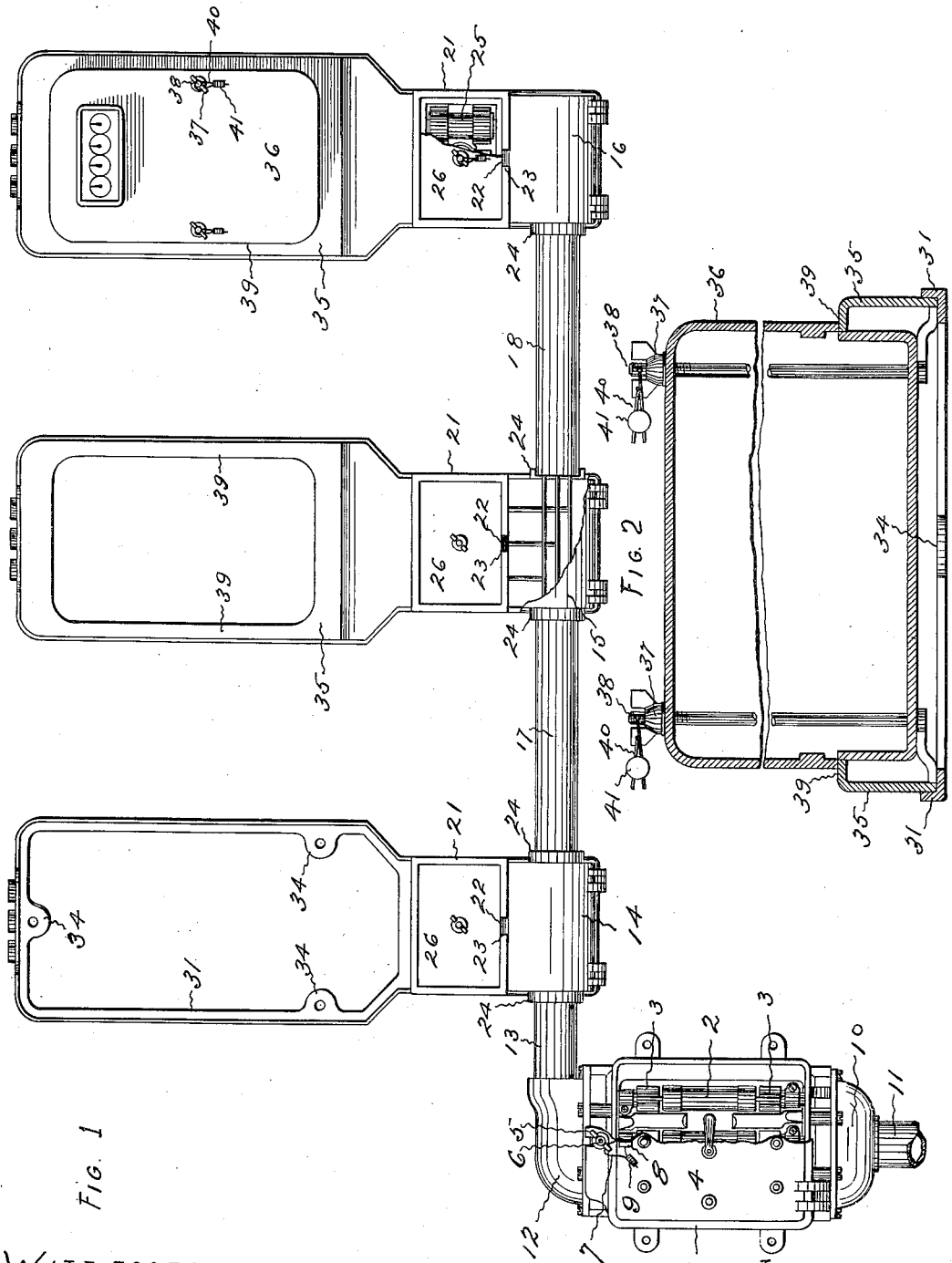

R. C. COLE.
ELECTRIC METER SERVICE PROTECTIVE APPARATUS.
APPLICATION FILED JUNE 1, 1909.

950,316.

Patented Feb. 22, 1910.
2 SHEETS—SHEET 2.

WITNESSES:

INVENTOR:
Robert Charles Cole
Harry P. Williams
atty.

UNITED STATES PATENT OFFICE.

ROBERT CHAS. COLE, OF WEST HARTFORD, CONNECTICUT, ASSIGNOR TO THE JOHNS-PRATT COMPANY, OF HARTFORD, CONNECTICUT, A CORPORATION OF CONNECTICUT.

ELECTRIC-METER-SERVICE PROTECTIVE APPARATUS.

950,316.

Specification of Letters Patent. Patented Feb. 22, 1910.

Application filed June 1, 1909. Serial No. 499,599.

*To all whom it may concern:*

Be it known that I, ROBERT CHARLES COLE, a citizen of the United States, residing at West Hartford, in the county of Hartford and State of Connecticut, have invented a new and useful Improvement in Electric-Meter-Service Protective Apparatus, of which the following is a specification.

This invention relates to such apparatus as is arranged where conductors carrying electric light, power or heat energy, enter a customer's premises from the subway or conduit, between the main service wires from the generating plant, and the branch wires that lead to the consumer's lamps, motors, heaters or other appliances.

The object of the invention is to provide a comparatively cheap apparatus which is simple to install, either singly or in multiple units, according to the conditions, and which is so designed that all of the parts which contain the necessary mechanisms, appliances and wires that carry current, are connected, interlocked and sealed in such manner that all of the conductors are so concealed and protected that it is absolutely impossible to surreptitiously obtain access to a conducting part on the service side of the system, that is, outside of the branch wires leading from a meter, without breaking a seal, thus effectively preventing theft of current.

In carrying out this invention, a sealed main service box, having the required two or three pole fused cut-out, and provided with a closed conduit fitting at the bottom and closed entrance hood at the top, is connected by tubing with one or more splicing or junction boxes. Each junction box, of which there may be any desired number, depending upon the number of branches to be led from the mains, has a base that is interlocked with the back of the lower part of a service block and has a hinged cover which is engaged with the front of the lower part of the service block in such manner that it is fastened closed by the cover of that block and cannot be opened when the block cover is sealed. Each service block is provided with two or more fuses, depending on the system with which the apparatus is used, which are connected with the branch wires that are joined with the main wires in the junction box and are connected with the wires that lead to the meter. Fitting the front of the service block is a cover that is sealed in place when the apparatus is installed. The meter, which may be any desired type, is fastened in a frame that is interlocked with the back of the upper part of the service block and is surrounded by a shell that fits the frame and also engages the service block. This shell is fastened in place by the cover of the meter case when that cover is sealed. These parts are so designed that they may be set up singly that is, for one meter, or any number arranged in parallel, for a plural number of meters and when installed they are interlocked so that no part can be removed or opened without first breaking a seal, consequently no wire can be tapped without showing the fact that the apparatus has been tampered with.

Figure 4:
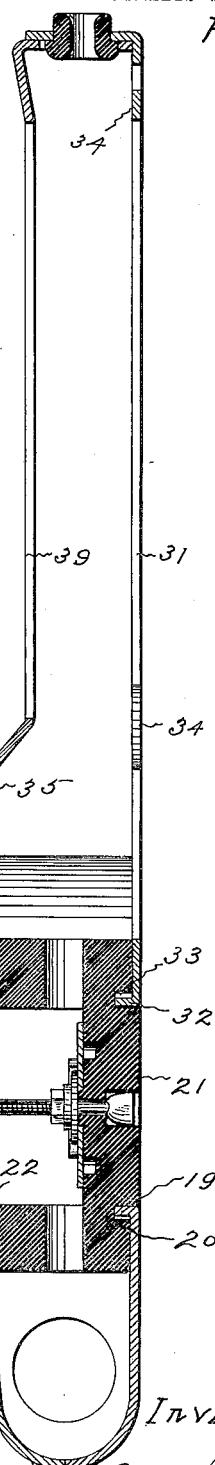

Figure 1 of the accompanying drawings shows a plan of an apparatus which embodies this invention, arranged for three meters. In this view but one meter is shown, and the cover of one service block, the cover of one junction box, and the cover of the service box are broken away, and other parts are omitted in order to better illustrate the construction. Fig. 2 shows a transverse section on larger scale of the meter base and cover, and the meter holding frame and surrounding shell, illustrating the manner in which these parts are connected and secured when the meter cover is sealed. Fig. 3 shows a plan of the meter supporting frame and surrounding shell, the service block and the junction box, which are interlocked with each other when installed. Fig. 4 shows a longitudinal section of the interlocked meter supporting frame and surrounding shell, service block and junction box.

The main service box 1 is of ordinary construction. In it are placed the required number of main service fuses 2. In the box shown the fuses are connected with terminals 3 and are arranged to be disconnected from the terminals by the opening of the cover 4, in the manner common to this type of fused cut-out service box. The service box cover is fastened closed by the thumb nut 5 turning on the screw 6, which nut is held from removal by the wire 7 which passes through a perforation in the nut and a perforation in the lug 8 on the cover, and has its ends secured by a seal 9 when the apparatus is in use. This box is designed to be bolted or otherwise permanently secured to a switchboard or panel in any convenient place, preferably adjacent to the locality where the main service wires enter the premises from a conduit or subway. Fastened to the lower end of the service box is a conduit fitting 10 having an opening, to which the end of the conduit 11 is to be connected. Fastened to the upper end of the main service box is an entrance hood 12, into which the end of a tube 13 is inserted.

Applied to the end of the tubing is a junction box 14. If the apparatus is to be arranged for a number of meters, additional junction boxes 15 and 16 may be provided and connected by sections of tubing 17 and 18. Each of the junction boxes shown is formed of two members that are hinged together at their lower edges. The upper edge of the base or back member of each of the junction boxes shown, is provided with a projecting rib 19 that is designed to fit into a groove 20 formed in the back of the lower edge of the service block 21, while the upper edge of the front member of each of the junction boxes shown, is provided with a projecting tongue 22 that is designed to fit into a mortise 23 in the lower edge of the front of the service block. The members of the junction box have semi-annular flanges, which, when the members are closed together, form hubs 24 which receive and clasp the ends of the tubing that extend between the entrance service box and the several junction boxes. The intermediate junction boxes 14 and 15 have hubs on both sides, but the last or end junction box 16 has a hub on the entrance side only, the other side being solid. The main service wires from the conduit or subway are led through the conduit fitting into the main service cut-out box and are connected with the fuses therein. The main conductors then extend from the other ends of the fuses through the entrance hood, tubing and several junction boxes. The junction boxes are of ample size to permit the ready splicing or joining of the branch wires with the main wires.

The service blocks are desirably formed of porcelain or other insulating material. In these blocks are the branch line fuses 25. The branch wires are joined with the main wires in the junction boxes and led through openings into the service blocks, and there connected with the fuse terminals. The service block has a cover 26, desirably formed of glass, that fits into the rabbeted front of the service block and is held in place by a thumb nut 27 that is screwed upon the threaded front end of the screw 28. One wing of this nut is provided with a perforation, and the end of the screw is also perforated. A wire 29 is passed through these perforations when the apparatus is installed, and the ends of the wire fastened by seal 30. The cover of the service block which is sealed in this manner, overlaps the tongue that projects from the front member of the junction box, and thus prevents the junction box from being opened until the seal is broken and the thumb nut unscrewed far enough for the service block cover to be lifted sufficiently to permit the front member of the junction box to be released therefrom. As the back member of the junction box is interlocked with the service block, by means of the rib and groove, the junction box is thus secured to the service block so that it cannot be removed or opened until the service block cover seal is destroyed. As the various connecting sections of tubing are located with their ends in the hubs of the junction boxes before the junction boxes are closed and secured, they cannot be removed until the junction boxes are opened.

The meter supporting frame 31 at its lower end has a forwardly projecting rib 32 that is designed to enter a groove 33 in the back near the upper edge of the service block. This frame also has inwardly extending perforated ears 34, the perforations in which coincide with the perforations through the legs of the meter base. In installing the apparatus, the rib at the top of the rear member of the junction box is engaged with its groove in the back of the service block, and the rib at the lower end of the meter supporting frame is engaged with its groove in the back of the service block, and then the service block is fastened in position Fig. 4. When this is accomplished these parts can not be separated without removing the service block. The meter is then installed by passing bolts through the perforations in its legs and the perforations in the ears which project inwardly from the meter supporting frame. After the meter base and the supporting frame have been secured in position, the shell 35 is arranged over the meter base. This shell fits the supporting frame and surrounds the meter base so as to conceal all of the wires which lead from the fuses in the service block to the meter connections. The lower end of the shell is also shaped to closely fit the upper part of the service box. After this shell has been placed in position, the meter case or cover 36 is placed over the meter and is secured in position by the nuts 37 which turn upon the threaded ends of the screws 38 in the usual manner. The opening in the front of the inclosing shell is made of such size and shape that it just fits the meter base and the flange 39 about this opening projects beneath the back edge of the meter case or cover so that when that case is fastened in position, as described, the shell is held down against the meter supporting frame and cannot be removed until the meter case or cover is taken off. The nuts and screws which secure the meter case are perforated, and when the apparatus is in use wires 40 are passed through these perforations and their ends secured by seals 41.

With this apparatus, all the parts are detachably connected in such manner that when the main service box, the service block and the meter supporting frame are secured in position, which is accomplished by concealed fastening means, the parts cannot be separated, and when the meter case or cover is applied and sealed and the service block cover is sealed, none of the parts can be opened. All of the wires and other conducting parts are hidden in this apparatus so that it is impossible for anyone to connect or apply wires for stealing current, without breaking one of the seals. The construction is such that the parts may be readily assembled without any special fitting for a single meter or for any number of meters, as desired.

The invention claimed is:

1. The combination in a meter service protective apparatus, of a service block adapted to receive fusible conductors, a cover adapted to be sealed upon said service block, a frame adapted to receive a meter base, said frame being detachably engaged with said service block, a shell adapted to inclose a meter base, said shell fitting said frame and engaging the service block, and a junction box composed of members which are joined together at their lower edges and have their upper edges detachably engaged with the service block.

2. The combination in a meter service protective apparatus, of a service block adapted to receive fusible conductors, a cover adapted to be sealed upon said service block, a meter, a frame adapted to receive the meter base, said frame being detachably engaged with said service block, a shell adapted to inclose the meter base, said shell fitting said frame and engaging the service block, a cover for said meter, fitting over said shell and adapted to be sealed to the meter base, and a junction box composed of members which are joined together at their lower edges and have their upper edges detachably engaged with the service block.

3. The combination in a meter service protective apparatus, of a service block adapted to receive fusible conductors, a cover adapted to be sealed upon said service block, a frame adapted to receive a meter base, said frame being detachably engaged with said service block, and a shell adapted to inclose the meter base, said shell fitting said frame and engaging the service block.

4. The combination in a meter service protective apparatus, of a service block adapted to receive fusible conductors, a cover adapted to be sealed upon said service block, and a junction box composed of members which are joined together at their lower edges and have their upper edges detachably engaged with the service block.

5. The combination in a meter service protective apparatus, of a service block adapted to receive fusible conductors, a cover adapted to be sealed upon said service block, a meter, a frame adapted to receive the meter base, said frame being detachably engaged with said service block, a shell adapted to inclose the meter base, said shell fitting said frame and engaging the service block, a cover for said meter, fitting over said shell and adapted to be sealed to the meter base, a junction box composed of members which are joined together at their lower edges and have their upper edges detachably engaged with the service block, a main service box adapted to receive fusible conductors, a closed conduit fitting attached to the bottom of said service box, a closed entrance hood attached to the top of said service box, and tubing extending from said entrance hood into and embraced by the members of said junction box.

6. The combination in a meter service protective apparatus, of a service block adapted to receive fusible conductors, a cover adapted to be sealed upon said service block, a frame adapted to receive a meter base, said frame having a projection extending into a recess in the service block, a shell adapted to inclose a meter base, said shell fitting said frame and engaging the service block, and a junction box composed of members which are hinged together at their lower edges, the rear member of said box having a projection extending into a recess in the service block, and the front member having a projection extending into a mortise in the service block beneath the cover thereof.

7. The combination in a meter service protective apparatus, of a meter, a frame adapted to receive the meter base, a shell adapted to inclose the meter base, a cover for said meter fitting over and retaining said shell, and means for sealing the cover to the meter base over said shell.

ROBERT CHAS. COLE.

Witnesses:
JENNY H. LEE,
HARRY R. WILLIAMS.